US008745512B2

(12) United States Patent
Jones et al.

(10) Patent No.: US 8,745,512 B2
(45) Date of Patent: Jun. 3, 2014

(54) METHOD AND COMPUTER-READABLE MEDIUM FOR INTERACTING WITH A PORTION OF AN ELECTRONIC DOCUMENT

(75) Inventors: Brian Jones, Redmond, WA (US);
Marcin Sawicki, Kirkland, WA (US);
Roberto C. Taboada, Duvall, WA (US);
Sumkin Son, Sammamish, WA (US);
Tristan A. Davis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 629 days.

(21) Appl. No.: 10/991,192

(22) Filed: Nov. 17, 2004

(65) Prior Publication Data

US 2006/0107225 A1 May 18, 2006

(51) Int. Cl.
*G06F 3/048* (2013.01)

(52) U.S. Cl.
USPC .......................................... 715/764

(58) Field of Classification Search
CPC . G06F 3/0481; G06F 17/211; G06F 17/2247; G06F 17/24
USPC .......................................... 715/764
See application file for complete search history.

(56) References Cited

U.S. PATENT DOCUMENTS

| 5,404,442 | A  | * | 4/1995 | Foster et al. | 715/769 |
|---|---|---|---|---|---|
| 6,246,411 | B1 | * | 6/2001 | Strauss | 715/863 |
| 6,269,389 | B1 | * | 7/2001 | Ashe | 718/100 |
| 6,587,128 | B2 | * | 7/2003 | Kanevsky et al. | 715/768 |
| 6,826,729 | B1 | * | 11/2004 | Giesen et al. | 715/837 |
| 7,478,336 | B2 | * | 1/2009 | Chen et al. | 715/770 |
| 7,703,036 | B2 | * | 4/2010 | Satterfield et al. | 715/777 |
| 2002/0089546 | A1 | * | 7/2002 | Kanevsky et al. | 345/800 |
| 2002/0135621 | A1 | * | 9/2002 | Angiulo et al. | 345/838 |
| 2002/0140734 | A1 | * | 10/2002 | Bennett | 345/764 |
| 2003/0076364 | A1 | * | 4/2003 | Martinez et al. | 345/810 |
| 2003/0142138 | A1 | * | 7/2003 | Brown et al. | 345/797 |

(Continued)

OTHER PUBLICATIONS

Microsoft® Office PowerPoint® 2003 Step by Step By: Online Training Solutions Inc. Publisher: Microsoft Press Pub. Date: Sep. 10, 2003 Print ISBN—13: 978-0-7356-1522-9 Print ISBN—10: 0-7356-1522-5 Pages in Print Edition: 368.*

*Primary Examiner* — William Bashore
*Assistant Examiner* — Henry Orr
(74) *Attorney, Agent, or Firm* — Rachael Vaughn; Jim Ross; Micky Minhas (57) ABSTRACT

A method and computer-readable medium are provided for interacting with a portion of an electronic document. According to the method, a UI control is displayed that includes a border surrounding the portion of the electronic document and one or more UI items that allow actions to be performed on the portion of the electronic document. The UI control may be displayed continually or displayed when user input is received within the portion of the electronic document. The border of the UI control may form a bounded region that is displayed transparently over the display of the portion of the electronic document. The transparency of the bounded region may be increased gradually when user input is received in the portion of the electronic document and removed gradually when user input is subsequently received outside the portion. A selectable region may be provided within the UI control for selecting and moving the portion of the electronic document to another location within the document.

18 Claims, 7 Drawing Sheets

(56) References Cited

U.S. PATENT DOCUMENTS

| | | | |
|---|---|---|---|
| 2003/0214540 A1* | 11/2003 | Huapaya et al. | 345/863 |
| 2003/0226105 A1* | 12/2003 | Waldau | 715/503 |
| 2004/0225968 A1* | 11/2004 | Look et al. | 715/778 |
| 2005/0094207 A1* | 5/2005 | Lo et al. | 358/1.18 |
| 2005/0097465 A1* | 5/2005 | Giesen et al. | 715/700 |
| 2005/0102630 A1* | 5/2005 | Chen et al. | 715/770 |
| 2005/0172239 A1* | 8/2005 | Liu et al. | 715/763 |
| 2006/0036945 A1* | 2/2006 | Radtke et al. | 715/708 |

\* cited by examiner

METHOD AND COMPUTER-READABLE MEDIUM FOR INTERACTING WITH A PORTION OF AN ELECTRONIC DOCUMENT

BACKGROUND OF THE INVENTION

Many modern computer operating systems provide a graphical user interface ("GUI") for interacting with the operating system and application programs. Through the use of a GUI, a user can more easily interact with a computer system and perform tasks that would not have been possible using traditional command line user interfaces. For instance, a GUI allows the creation and editing of rich electronic documents in a manner that would not have been previously possible.

Although a GUI makes the creation and editing of electronic documents much easier than previously possible, there are certain tasks that are still difficult to perform utilizing modern GUIs and applications programs. For instance, in many modern application programs, formatting codes and other information can be applied to the contents of a document but not displayed to the user. As an example, text in a word processing document may be tagged with extensible markup language ("XML") that is not displayed to the user. As another example, one or more styles may be applied to text within a document for formatting the text as a paragraph, list, or other type of format. In cases such as these, it can be difficult for a user to determine the exact boundaries of the formatting or to see the underlying XML without issuing a special command to the application to reveal the formatting. When the formatting is revealed, the look and flow of the document is changed, thereby making it very difficult for a user to edit the document with a clear understanding as to how the changes will affect the look and flow of the document. A similar problem occurs when a user is editing mathematical equations that appear to the user as normal document content. However, special typographical rules may apply to the equation which are not normally apparent to the user.

Another consequence of the problems described above is that it is very difficult, utilizing current GUIs, to select the entire portion of certain types of regions within an electronic document. For instance, it may be difficult for a user to select a region that has had a certain style applied to it and to be certain that the entire region has been selected without selecting any portion of the surrounding regions. As a consequence, it may also be difficult for a user to move the entire portion of certain types of regions to another location within the document.

Another shortcoming of current GUIs for interacting with electronic documents is that it often can be difficult for a user to locate user interface controls for performing actions related only to the content within a selected region. For instance, if a user selects a table of contents and desires to perform an action for updating the table of contents, it may be difficult for the user to locate the UI control for performing the function. In many cases, a user may have to search menus or hunt through rows of icons to find the appropriate UI control. This process can be time consuming and frustrating for a user.

It is with respect to these considerations and others that the various embodiments of the present invention have been made.

BRIEF SUMMARY OF THE INVENTION

In accordance with the embodiments of the present invention, the above and other problems are solved by a method and computer-readable medium for interacting with a portion of an electronic document. In particular, a new UI control is provided that allows a user to quickly visualize the boundaries of a portion of a document and to obtain additional information about the portion without affecting the look or flow of the remainder of the document. The user interface control also allows a user to easily select only the desired portion of the document, to easily move only the portion of the document, and to easily locate and utilize controls for performing relevant actions on the portion of the document.

According to one embodiment of the invention, a computer-readable medium is provided having computer-executable instructions stored thereon which, when executed by a computer, cause the computer to provide an improved UI control for interacting with a portion of an electronic document. The UI control includes a border surrounding the portion of the electronic document and is displayed in a manner to cause the UI control to appear as if it is hovering over the electronic document. In particular, display of the UI control does not change the look or flow of the display of the remainder of the document.

According to various embodiments of the invention, the border forms a bounded region that includes the portion of the electronic document. The bounded region may be displayed utilizing various levels of transparency over the display of the portion of the electronic document. In one embodiment, the UI control is displayed continually. Alternatively, in another embodiment, the UI control is displayed only when user input is received in the portion of the electronic document, thereby providing a visual indication that the portion of the electronic document is active. When user input is subsequently received outside the UI control, the display of the UI control may be removed.

According to other embodiments of the invention, the border of the UI control may be a fixed size. Alternatively, the UI control may adjust the size of the border in response to the growth or shrinkage of the portion of the electronic document. For instance, if the portion of the electronic document comprises a table of contents, the border may grow and shrink appropriately with the size of the table of contents.

According to other aspects of the invention, the UI control may include a selectable region that allows a user to quickly select the entire contents of the portion of the electronic document. The selectable region may also be utilized to easily move the portion of the electronic document to another location within the document. Additionally, the UI control may also include another selectable region containing UI elements for performing actions on the portion of the electronic document. In particular, one or more UI buttons may be provided which, when selected, will cause an action to be performed on the portion of the electronic document. One or more UI menus may also be provided for exposing additional actions that may be performed on the portion of the electronic document.

According to another embodiment of the invention, a method is provided for interacting with a portion of an electronic document. According to the method, a UI control may be displayed for interacting with the portion of the electronic document. The UI control includes a border surrounding the portion of the electronic document and one or more UI items which, when selected, will cause relevant actions to be performed on the portion of the electronic document encompassed by the UI control. The UI items may be displayed within the UI control and adjacent to the portion of the electronic document.

According to additional aspects of the method, the UI control may be displayed continually or displayed when user input is received within the portion of the electronic document. The border of the UI control may form a bounded region that is displayed transparently over the display of the portion of the electronic document. The transparency of the bounded region may be increased gradually when user input is received in the portion of the electronic document. When user input is received outside the portion of the electronic document, the UI control may be removed. The transparency of the bounded region may be reduced gradually until the UI control is no longer visible on the display screen.

According to other aspects of the invention, the portion of the electronic document may comprise a table of contents, a math editing region for providing enhanced functionality for editing mathematical equations, a table, document text or content linked to external data such as document properties or a database, an image, arbitrary text, or formatting codes or other types of invisible properties. The UI control provided by the various embodiments is also suitable for use with any other type of content.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
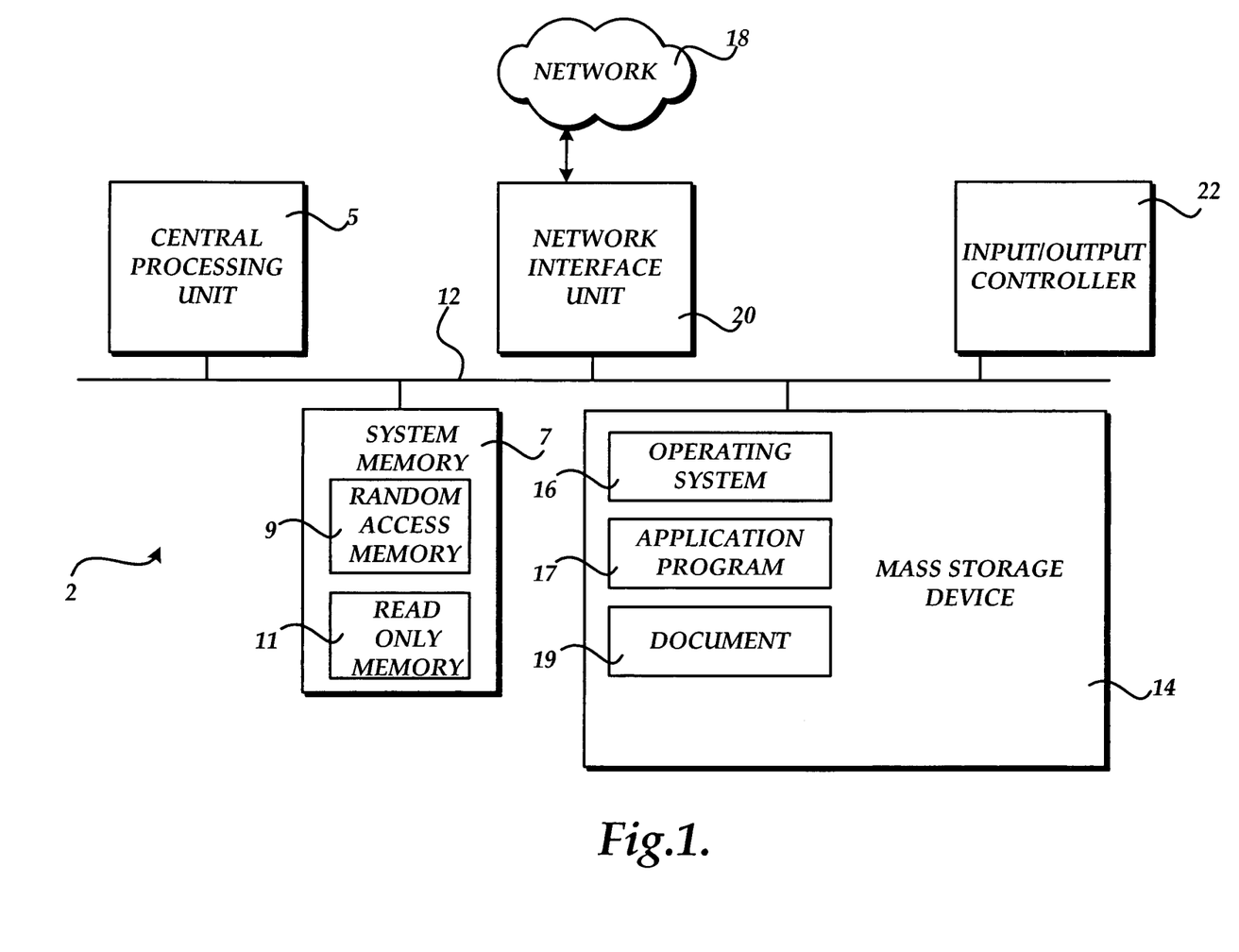
FIG. 1 is a computer system architecture diagram illustrating a computer system utilized in and provided by the various embodiments of the invention.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, one or more application programs 17, and one or more documents 19, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and RAM 9 may store an application program 17 for creating and editing an electronic document 19. According to the various embodiments of the invention described herein, the application program 17 comprises a word processing application program, such as the WORD word processing application from MICROSOFT CORPORATION. It should be appreciated, however, that the various aspects of the invention described herein may be utilized with any type of application program for creating, editing, or interacting with any type of electronic document. For instance, the embodiments of the invention described herein may be utilized with spreadsheet application programs, presentation application programs, drawing programs, computer-aided design programs, and virtually any other type of application program that utilizes a GUI to allow a user to interact with the contents of an electronic document. The embodiments of the invention may also be utilized within a GUI provided by an operating system.

As will be described in greater detail herein, the application program 17 provides a new UI control that allows a user to quickly visualize the boundaries of a portion of the document 19 and to obtain additional information about the document portion without affecting the look or flow of the remainder of the document. The new UI control also allows a user to easily select only the desired portion of the document 19, to easily move only the portion of the document 19, and to easily locate and utilize controls for performing relevant actions on the portion of the document 19. Additional details regarding the operation and use of the new UI control provided by the embodiments of the invention are described below with respect to FIGS. 2-9.

Figure 2:
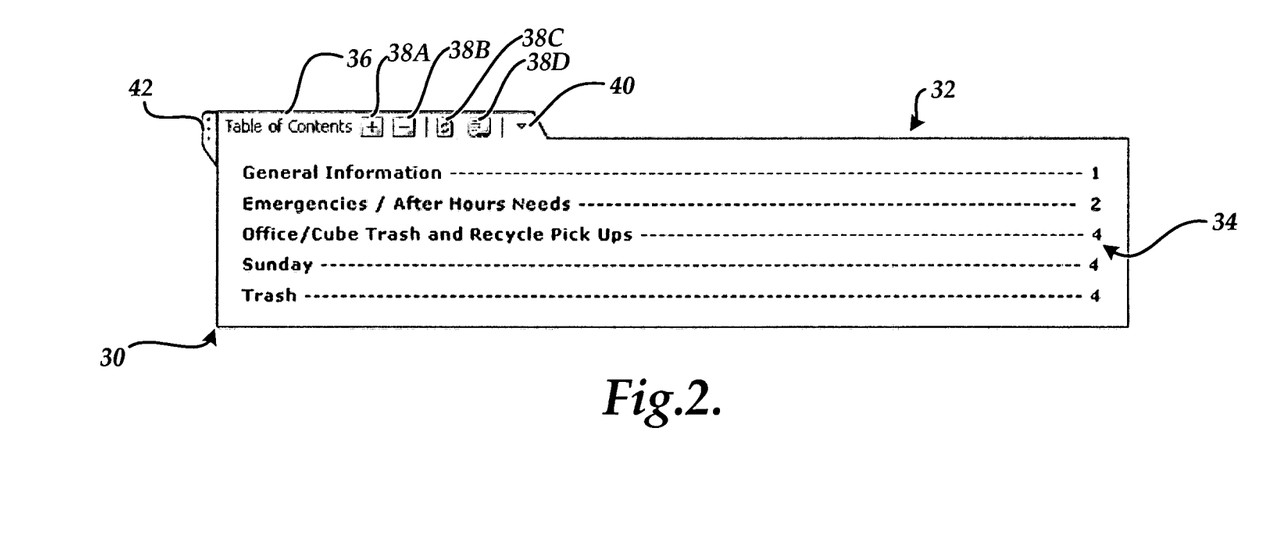
FIGS. 2-8 are screen display diagrams illustrating several screen displays provided by the various embodiments of the invention.

Referring now to FIG. 2, an illustrative user interface provided by the various embodiments of the invention will be described. In particular, FIG. 2 shows a screen display generated by the application program 17 that includes the new UI control 30. As shown in FIG. 2, the UI control 30 includes a border 32 surrounding a displayed portion 34 of the electronic document 19. In the example shown in FIG. 2, the portion 34 of the document 19 comprises a table of contents. As will be described in greater detail below, the UI control 30 may be utilized with any type of content within the document 19.

According to the various embodiments of the invention, the UI control 30 is displayed in a manner to cause the UI control 30 to appear as if it is hovering over the displayed electronic document 19. In particular, display of the UI control 30 does not change the look or flow of the display of the remainder of the document. This is done to make clear to the user that the UI control 30 is not a part of the actual document, but rather, only a guide for interacting with the document.

As shown in FIG. 2, the border 32 forms a bounded region around the portion 34 of the electronic document 19. In one embodiment, the UI control 30 is displayed continually. Alternatively, in another embodiment, the UI control 30 is displayed only when user input is received in the portion 34 of the electronic document 19 or the UI control 30 is selected, thereby providing a visual indication that the portion 34 of the electronic document 19 is active. When user input is subsequently received outside the UI control 30, the display of the UI control 30 may be removed from the display screen. The UI control 30 may be displayed in a manner that causes it to gradually appear when it is displayed and to gradually disappear when it is removed.

According to other embodiments of the invention, the bounded region may be displayed utilizing various levels of transparency over the display of the portion 34 of the electronic document 19. In particular, according to one embodiment of the invention, the bounded region 34 may be displayed gradually when user input is received in the portion 34 of the electronic document 17 by varying the transparency of the bounded region from a transparent state to a semi-transparent or opaque state. When user input is received outside of the portion 34 of the electronic document 19, the UI control 30 is removed from the display screen gradually by varying the transparency of the bounded region from a semi-transparent or opaque state to a completely transparent state.

According to other embodiments of the invention, the border 32 of the UI control 30 is set at a fixed size. Alternatively, the UI control 30 may adjust the size of the border 32 in response to the growth or shrinkage of the portion 34 of the electronic document 19 that it encompasses. For instance, if the table of contents encompassed by the UI control 30 in FIG. 2 were to grow or shrink, the UI control 30 would adjust the border 32 to grow or shrink appropriately with the size of the table of contents.

According to other aspects of the invention, the UI control 30 may include a selectable region 42 that allows a user to quickly select the portion 34 of the electronic document 30 encompassed by the UI control 30. Selection of the region 42 selects all of the contents of the portion 34 and no more. In this manner, a user can quickly select the portion 34 of the document 19 with the assurance that no other information has been selected. The selectable region 42 may also be utilized to easily move the portion 34 of the electronic document 19 to another location within the document 19. To utilize the region 42 in this manner, the user may utilize a mouse or other input device to "grab" the region 42. The user may then "drag" the selection to another place in the document 19. In response to such a command, the UI control 30 and the portion 34 of the electronic document 19 that it encompasses will be moved to the new location selected by the user.

According to other embodiments of the invention, the UI control may also include another selectable region containing UI elements for performing certain actions on the portion 34 of the electronic document 19 encompassed by the UI control 30. In particular, one or more UI buttons 38A-38D may be provided which, when selected, will cause an action to be performed on the portion 34 of the electronic document 19. For instance, as shown in FIG. 2, the buttons 38A and 38B may be utilized to add or remove entries from the table of contents within the border 32, respectively. In this manner, a user may quickly locate some or all of the available actions for the type of content encompassed by the UI control 30. Additionally, a UI menu may be made available that includes additional actions that may be performed on the contents of the UI control 30. The UI menu may be accessed through a selection of the menu drop down 40. The UI control 30 may also include descriptive text 36 for providing a description to the user regarding the contents of the document portion 34. Additional details regarding the UI menu will be provided below with respect to FIG. 3.

Figure 3:
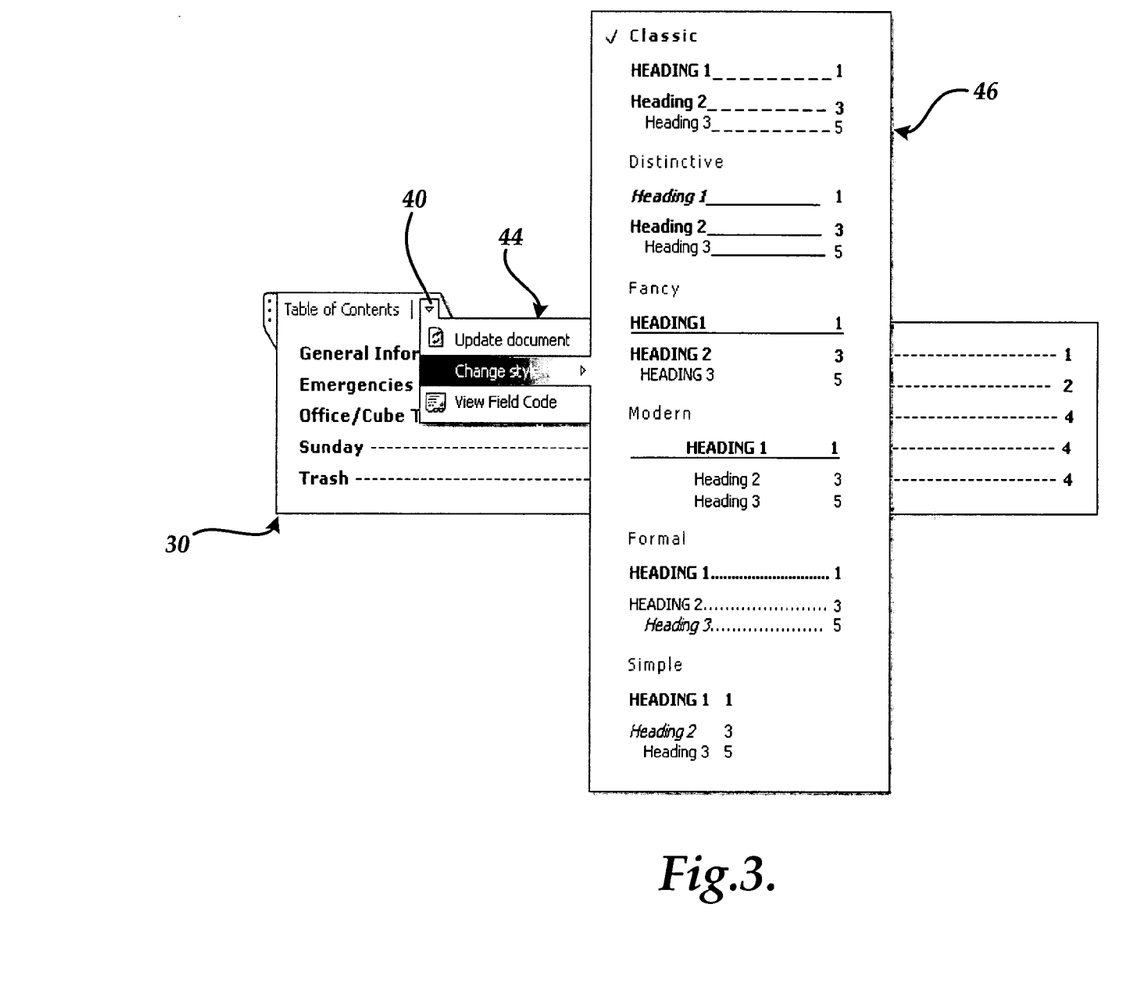

Turning now to FIG. 3, additional details regarding the operation of the UI control 30 will be provided. In particular, FIG. 3 illustrates the display provided by the UI control 30 when the menu drop down 40 has been selected. In response to the selection of the menu drop down 40, the menu 44 is displayed that identifies one or more additional actions that may be performed on the portion of the document 19 encompassed by the UI control 30. The user may then select one of the additional actions to perform the selected action. Alternatively, the menu 44 may include additional menus, such as the menu 46. In the example shown in FIG. 3, one of the menu items in the menu 44 is for changing the style of the table of contents encompassed by the UI control 30. When the menu item for changing style is selected, the menu 46 is displayed. The user may then select one of the available styles from the menu 46 which will then be applied to the table of contents. It should be appreciated that virtually any number of actions and sub-menus may be represented and made available to the user in this manner.

Figures 4A, 4B:
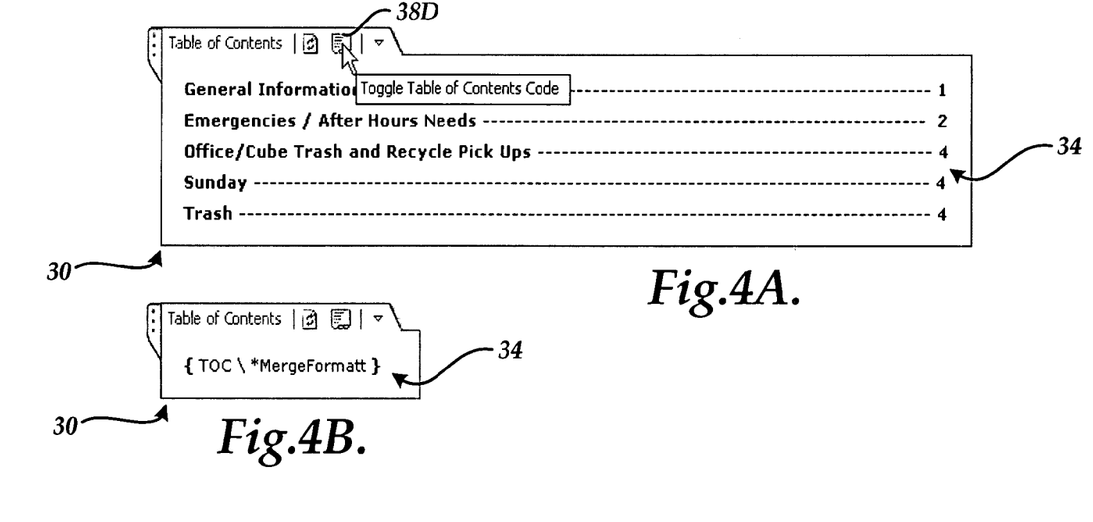

Referring now to FIGS. 4A and 4B, additional details regarding the operation of the UI control 30 will be described. As shown in FIG. 4B, a user interface button 38D may be provided within the UI control 30 for revealing the codes underlying the contents of the document portion 34. In response to the selection of the user interface button 38D, the user interface control 30 is operative to display the field properties for the table of contents, such as that shown in FIG. 4B. It should be appreciated that when the user interface control 30 displays the codes as shown in FIG. 4B, the flow of the remaining portion of the document 19 is not modified. In this manner, a user can view underlying information for a portion of the document 19 without modifying the look and flow of the remaining portion of the document. It should be appreciated that the UI control 30 may be utilized to show XML, formatting codes, properties, styles, and other information associated with the portion 34 of the document 19 encompassed by the UI control 30 in a similar manner.

Figure 5:
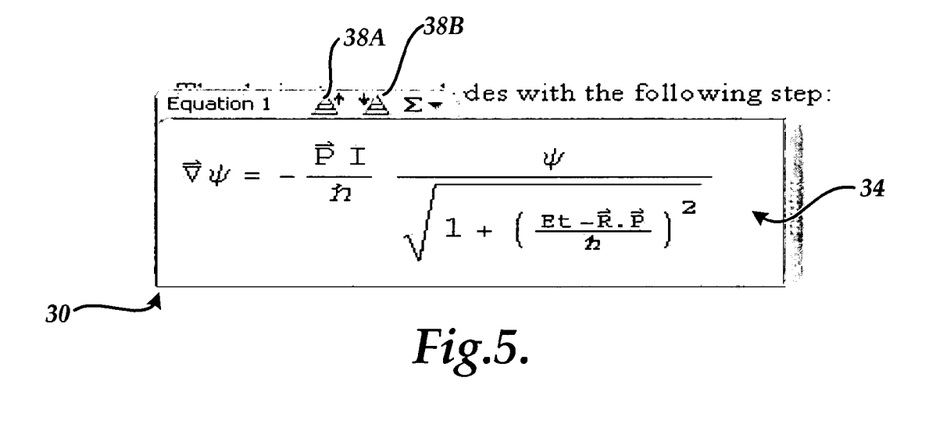

Turning now to FIG. 5, additional aspects of the invention will be described. In particular, FIG. 5 illustrates the use of the UI control 30 with a math editing region 34. When a user is editing in the math editing region 34, special functionality is provided for easily creating and editing mathematical equations. By utilizing the UI control 30, the bounds of the math editing region 34 are easily discernable to the user. Moreover, actions performable on a mathematical equation within the math editing region are easily accessible through the use of the adjacent UI buttons 38A-38B. Codes, styles, properties, and other information for the mathematical equation may also be displayed within the UI control 30 in the manner described above. Additionally, the math editing region 34 encompassed by the UI control 30 may also be selected and moved in the manner described above.

Figure 6:
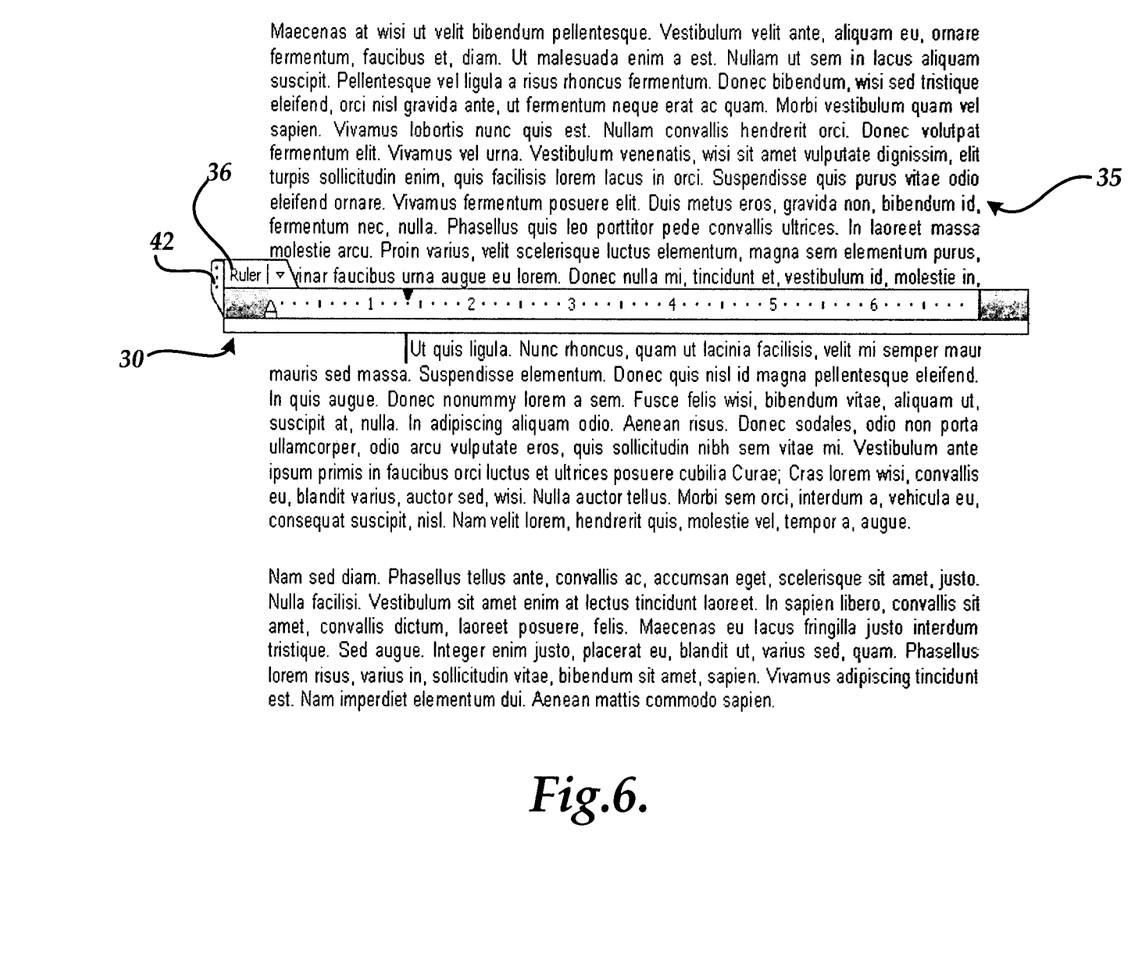

Referring now to FIG. 6, another embodiment of the invention will be described. In this embodiment of the invention, the UI control 30 is rendered as a ruler that may be placed by a user over the document 35. The selectable area 42 may be selected by a user and utilized to "drag" the UI control 30 over any area of the document 35. The UI control 30 in this embodiment may also include descriptive text 36 and a drop-down menu for accessing actions that may be performed utilizing the UI control 30.

As shown in FIG. 6, the UI control 30 in this embodiment displays information regarding the margins and tab points for the portion of the document 35 over which the UI control 30 is displayed. Portions of the UI control 30 may be selected to modify the margins and tab points. By utilizing the UI control 30 in this manner, benefits are realized over previous document rulers such as allowing a user to place the ruler at any position on the screen and relative to any content within the document 35. Additional benefits will be realized by those skilled in the art.

Figure 7A:
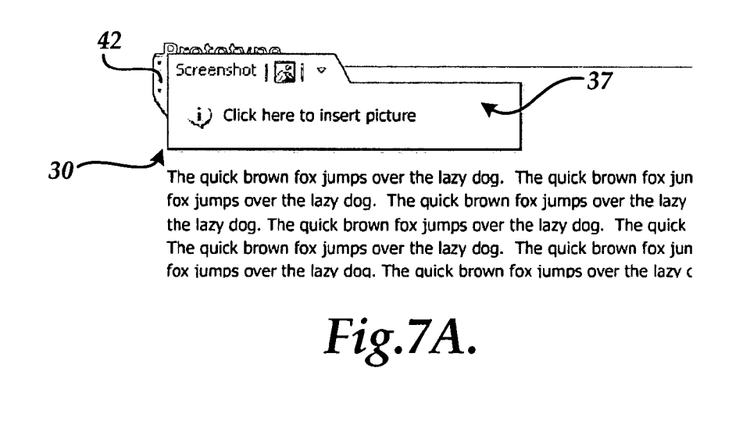
Figure 7B:
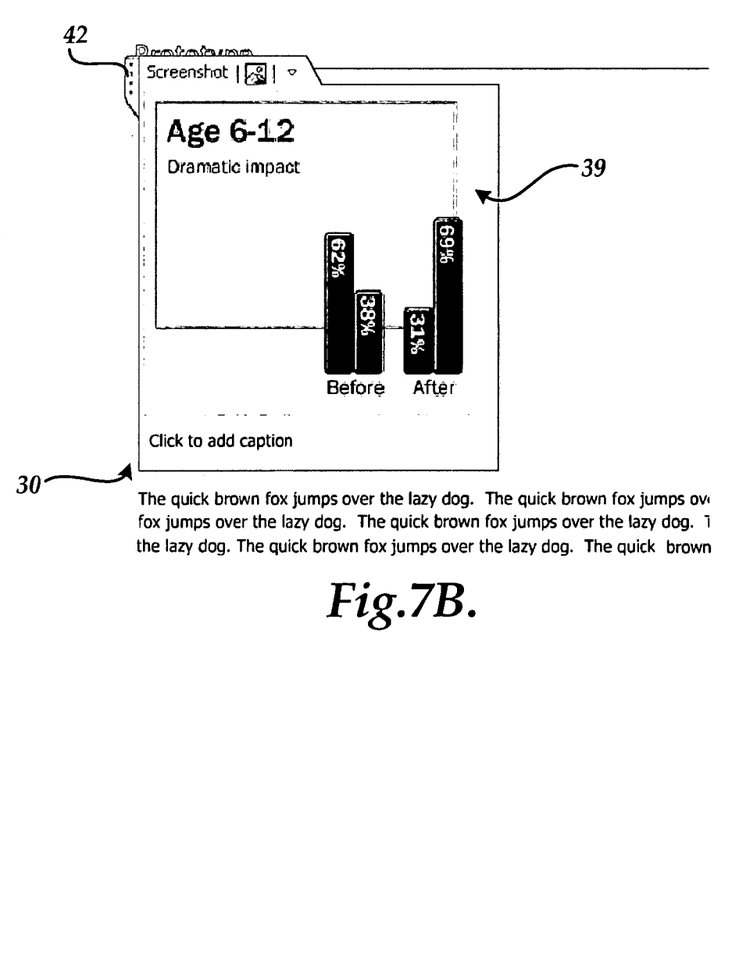

Turning now to FIGS. 7A and 7B, another embodiment of the invention will be described. In this embodiment of the invention, the UI control 30 is utilized as a placeholder for information to be inserting into the document 19. For instance, as shown in FIG. 7A, the UI control 30 is acting as a placeholder for an image. The text 37 within the UI control 30 indicates to a user that the UI control 30 may be selected to insert an image. In response to the selection of the text 37, the user may be asked to identify the image and the selected image is loaded. As shown in FIG. 7B, the loaded image 39 is encompassed by the border of the UI control 30. It should be appreciated that the UI control 30 may also be utilized to act as a placeholder for other types of information, such as text, tables, numeric information, and other types of content. A caption may also be added for the image within the UI control 30. Additionally, the UI control 30 illustrated in FIGS. 7A and 7B may also be selected and moved using the selectable region 42 in the manner described above. Actions performable on the image 39 may also be made available through user interface buttons displayed within the border of the UI control 30.

Figure 8:
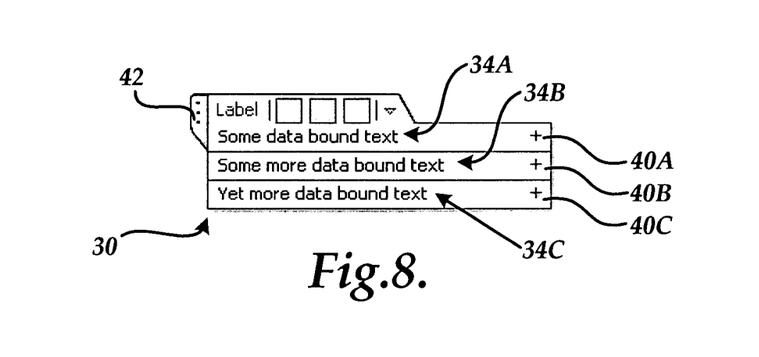

Referring now to FIG. 8, another embodiment of the invention will be described. In this embodiment of the invention, the UI control 30 provides a user interface for receiving and displaying repeating data fields. In the example shown in FIG. 8, repeating text fields may be input into the UI control 30. For instance, the fields 34A-34C include text input by a user into the UI control 30. The UI buttons 40A-40C may be selected to add a new field to the UI control 30. This features is useful for quickly inputting data into repeating fields. It should be appreciated that the UI control 30 illustrated in FIG. 8 may also be selected and moved using the selectable region 42 in the manner described above. Actions performable on fields 34A-34C may also be made available through user interface buttons displayed within the border of the UI control 30.

According to other embodiments of the invention, the UI control provided herein may be utilized to indicate to a user whether their input, such as typing, will be received inside or outside a specific range of a document. For instance, it is often difficult for a user to know whether the text they are type will appear within an equation or just adjacent to the equation. The UI control provided herein can be used to clearly indicate to the user whether they are typing inside or outside of a specific range.

Figure 9:
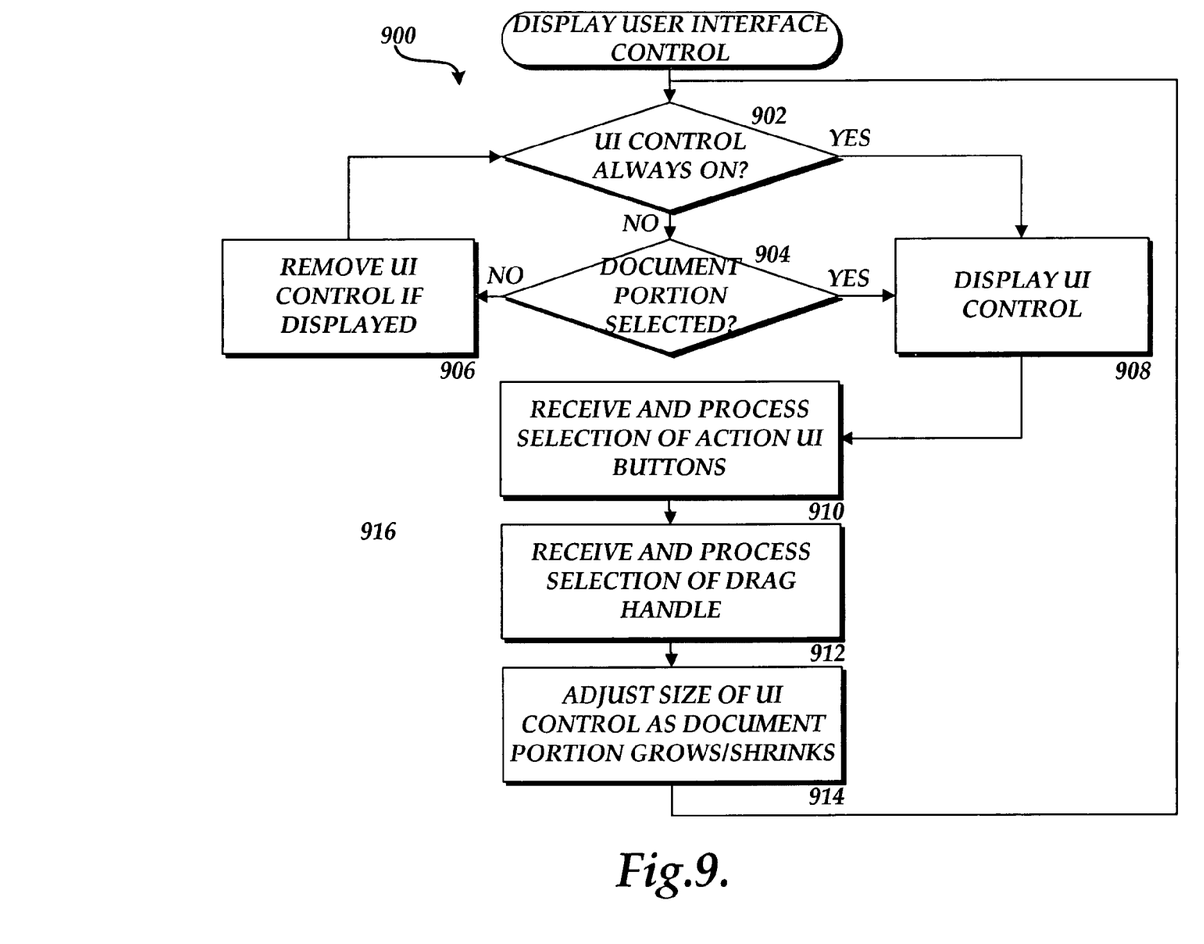
FIG. 9 is a flow diagram illustrating a processes provided by the several embodiments of the invention for interacting with a portion of an electronic document.

Referring now to FIG. 9, an illustrative routine 900 will be described illustrating a process performed by the application program 17 for providing the new UI control described herein. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 9, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Before describing the routine 900, it should be appreciated that the UI control 30 may have any number of visible states to indicate different things to a user. For instance, the UI control 30 may be continually displayed and active to call the user's attention to a region. The UI control 30 may alternatively be active one when the content encompassed by the UI control 30 receives input. This is useful for on-demand information and actions. Additionally, the UI control 30 may be gradually activated depending on the proximity of a mouse or text cursor to the UI control 30. Additional details regarding this process are provided below with respect to the routine 900.

The routine 900 begins at operation 902, where a determination is made as to whether the UI control 30 is to be continually displayed, as opposed to being displayed only when selected. If the UI control 30 is to be continually displayed, the routine 900 branches to operation 908, where the UI control is displayed in the manner described above. If the UI control 30 is to be displayed only when the region the control is associated with is receiving input, the routine 900 continues to operation 904, where a determination is made as to whether the UI control 30 has been selected, using mouse or keyboard input, for instance. If the UI control 30 is not currently selected, the routine 900 branches to operation 906, where the UI control 303 is removed from this display screen. In this manner, the UI control 30 is removed when not selected. If the UI control 30 is currently selected, however, the routine 900 branches to operation 908, where the UI control is displayed in the manner described above.

From operation 908, the routine 900 continues to operation 910, where selections of the user interface buttons provided by the UI control 30 for performing actions on the encapsulated portion of the document are received. If such a request to perform an action is received, the appropriate action is performed on the portion of the document. The routine 900 then continues to operation 912.

At operation 912, user input of the selectable region 42 is received and processed. As discussed above, a user may select the UI control 30 and the portion of the electronic document it encompasses through a selection of the region 42. The user may then move the UI control 30 and the document portion to another region. This input is received and processed at operation 912. From operation 912, the routine 900 continues to operation 914.

As discussed above, the UI control 30 may be defined as a fixed size or a dynamic size based on the size of the object it encompasses. If the UI control 30 has been defined as dynamic, the UI control 30 adjusts the size of the bounding box to adjust to the growth or shrinkage of the portion of the document it encompasses at operation 914. It should be appreciated that operations 910-914 are typically performed in parallel. From operation 914, the routine 900 returns to operation 902, where the routine 900 executes again.

Based on the foregoing, it should be appreciated that the various embodiments of the invention include a method, system, apparatus, and computer-readable medium for interacting with a portion of an electronic document. It should also be appreciated that the UI control 30 described herein may be utilized with different types of content available within virtually any type of electronic document, such as tables of contents, cover pages, sidebars, pull quotes, headers, footers, bibliography, citations, comments, content bound to external data, calculated document fields, math regions, pictures, tables, placeholders, pages, sections, XML markup, formatting properties, spreadsheet cells, any text with formatting, numerical information, editing regions, and other constructs that may be utilized within an electronic document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage device having computer-executable instructions stored thereon which, when executed by a computer, will cause the computer to perform the following:

displaying a user interface control for interacting with a portion of an electronic document, wherein the portion of the electronic document encompasses a viewable subsection of the electronic document, the user interface control comprising a border surrounding the portion of the electronic document, displaying text for providing a description of the portion of the electronic document, and displaying a selectable region for performing at least one of a plurality of actions on the portion of the electronic document encompassed by the user interface control, wherein the plurality of actions are associated with editing contents of the encompassed portion of the electronic document, the border forming a bounded region and wherein the bounded region is displayed with a level of transparency over the portion of the electronic document, the user interface control being displayed when the portion of the electronic document receives input and not displayed when the portion of the electronic document does not receive input, wherein the user interface control regulates a size of the border, wherein the size of the border is automatically adjusted in response to growth and shrinking of the portion of the electronic document, wherein the portion of the electronic document is configured to be edited within the border, wherein the portion of the electronic document is configured to be inserted to a different location of the electronic document by dragging the user interface control to the different location of the electronic document, and wherein the user interface control is configured to be used as a place holder for at least one of an image and input text to be inserted into the electronic document.

2. The computer-readable storage device of claim 1, wherein displaying the user interface control for interacting with the portion of the electronic document comprises displaying the user interface control wherein the portion of the electronic document comprises a table of contents.

3. The computer-readable storage device of claim 1, wherein displaying the user interface control for interacting with the portion of the electronic document comprises displaying the user interface control wherein the portion of the electronic document comprises a math editing region.

4. The computer-readable storage device of claim 1, wherein displaying the user interface control for interacting with the portion of the electronic document comprises displaying the user interface control wherein the portion of the electronic document comprises a table.

5. The computer-readable storage device of claim 1, wherein displaying the user interface control for interacting with the portion of the electronic document comprises displaying the user interface control wherein the portion of the electronic document comprises repeating content.

6. The computer-readable storage device of claim 1, wherein displaying the user interface control for interacting with the portion of the electronic document comprises displaying the user interface control wherein the portion of the electronic document comprises an image.

7. A method comprising:

displaying a user interface control for interacting with a portion of an electronic document, wherein the portion of the electronic document encompasses a viewable subsection of the electronic document, the user interface control comprising a border surrounding the portion of the electronic document, displaying text for providing a description of the portion of the electronic document, and displaying a selectable region for performing at least one of a plurality of actions on the portion of the electronic document encompassed by the user interface control, wherein the plurality of actions are associated with editing contents of the encompassed portion of the electronic document, the border forming a bounded region and wherein the bounded region is displayed with a level of transparency over the portion of the electronic document, the user interface control being displayed when the portion of the electronic document receives input and not displayed when the portion of the electronic document does not receive input, wherein the user interface control regulates a size of the border, wherein the size of the border is automatically adjusted in response to growth and shrinking of the portion of the electronic document, wherein the portion of the electronic document is configured to be edited within the border, wherein the portion of the electronic document is configured to be inserted to a different location of the electronic document by dragging the user interface control to the different location of the electronic document, and wherein the user interface control is configured to be used as a place holder for at least one of an image and input text to be inserted into the electronic document.

8. The method of claim 7, wherein displaying the user interface control for interacting with the portion of the electronic document comprises displaying the user interface control wherein the portion of the electronic document comprises a table of contents.

9. The method of claim 7, wherein displaying the user interface control for interacting with the portion of the electronic document comprises displaying the user interface control wherein the portion of the electronic document comprises a math editing region.

10. The method of claim 7, wherein displaying the user interface control for interacting with the portion of the electronic document comprises displaying the user interface control wherein the portion of the electronic document comprises a table.

11. The method of claim 7, wherein displaying the user interface control for interacting with the portion of the electronic document comprises displaying the user interface control wherein the portion of the electronic document comprises repeating content.

12. The method of claim 7, wherein displaying the user interface control for interacting with the portion of the electronic document comprises displaying the user interface control wherein the portion of the electronic document comprises an image.

13. A system comprising:
a memory storage; and
a processing unit coupled to the memory storage, wherein the processing unit is operative to:
   display a user interface control for interacting with a portion of an electronic document, wherein the portion of the electronic document encompasses a viewable subsection of the electronic document, the user interface control comprising a border surrounding the portion of the electronic document,
   display text for providing a description of the portion of the electronic document, and
   display a selectable region for performing at least one of a plurality of actions on the portion of the electronic document encompassed by the user interface control, wherein the plurality of actions are associated with editing contents of the encompassed portion of the electronic document, the border forming a bounded region and wherein the bounded region is displayed with a level of transparency over the portion of the electronic document, the user interface control being displayed when the portion of the electronic document receives input and not displayed when the portion of the electronic document does not receive input, wherein the user interface control regulates a size of the border, wherein the size of the border is automatically adjusted in response to growth and shrinking of the portion of the electronic document, wherein the portion of the electronic document is configured to be edited within the border, wherein the portion of the electronic document is configured to be inserted to a different location of the electronic document by dragging the user interface control to the different location of the electronic document, and wherein the user interface control is configured to be used as a place holder for at least one of an image and input text to be inserted into the electronic document.

14. The system of claim 13, wherein the portion of the electronic document comprises a table of contents.

15. The system of claim 13, wherein the portion of the electronic document comprises a math editing region.

16. The system of claim 13, wherein the portion of the electronic document comprises a table.

17. The system of claim 13, wherein the portion of the electronic document comprises repeating content.

18. The system of claim 13, wherein the portion of the electronic document comprises an image.

* * * * *